No. 714,289. Patented Nov. 25, 1902.
P. H. ERTHEILER.
MACHINE FOR PREPARING LEAF TOBACCO FOR MANUFACTURE INTO CIGARS.
(Application filed July 24, 1901.)
(No Model.) 2 Sheets—Sheet 2.

WITNESSES: INVENTOR
Wm. H. Bradley P. H. Ertheiler
Jas. Beale by S. Lloyd Wiegand
atty

UNITED STATES PATENT OFFICE.

PHILIP H. ERTHEILER, OF PHILADELPHIA, PENNSYLVANIA.

MACHINE FOR PREPARING LEAF-TOBACCO FOR MANUFACTURE INTO CIGARS.

SPECIFICATION forming part of Letters Patent No. 714,289, dated November 25, 1902.

Application filed July 24, 1901. Serial No. 69,599. (No model.)

*To all whom it may concern:*

Be it known that I, PHILIP H. ERTHEILER, a citizen of the United States, residing at Philadelphia, Pennsylvania, have invented a new and useful Machine for Preparing Leaf-Tobacco for Manufacture into Cigars, Cigarettes, Smoking-Tobacco, and Chewing-Tobacco, of which the following is a specification, reference being had to the accompanying drawings, forming a part thereof.

In the manufacture of tobacco into cigars and other merchantable forms fitted for consumption the usual practice is to sever the web portions of the leaves from the stems and to reject the stems, which are thick and tough and are of slower combustible properties than the web. This operation wastes not only the stem, but also a part of the web adhering to the stem, and reduces a considerable part of the web to small fragments, known in trade as "scrap," which is of small value as compared with the leaf. Attempts have been made to use the stems of tobacco with the leaves by crushing them directly with rollers, the leaves being introduced in a direction at right angles to the axes of the rollers. This is found to stretch or extend the stems lengthwise and to disintegrate the leaves.

My invention has for its object the spreading of the stems laterally and during this operation to support the web portion of the leaf during its passage between the rollers and to convey it safely without disintegration, so that the leaves are delivered of uniform thickness in all parts and the entire leaf is susceptible of satisfactory utilization for manufacture and use; and to this end my invention consists in a series of rollers combined with endless aprons of non-adhesive material adapted to receive the leaves with the stems in parallel position with the axes of the rollers and support them during the operation of spreading and flattening of the stems by the pressure of the rollers and convey them and remove them for use by a combination of doctors or scrapers with the aprons and rollers and a draining apparatus, as hereinafter described and shown in the accompanying drawings, in which—

Figure 1:
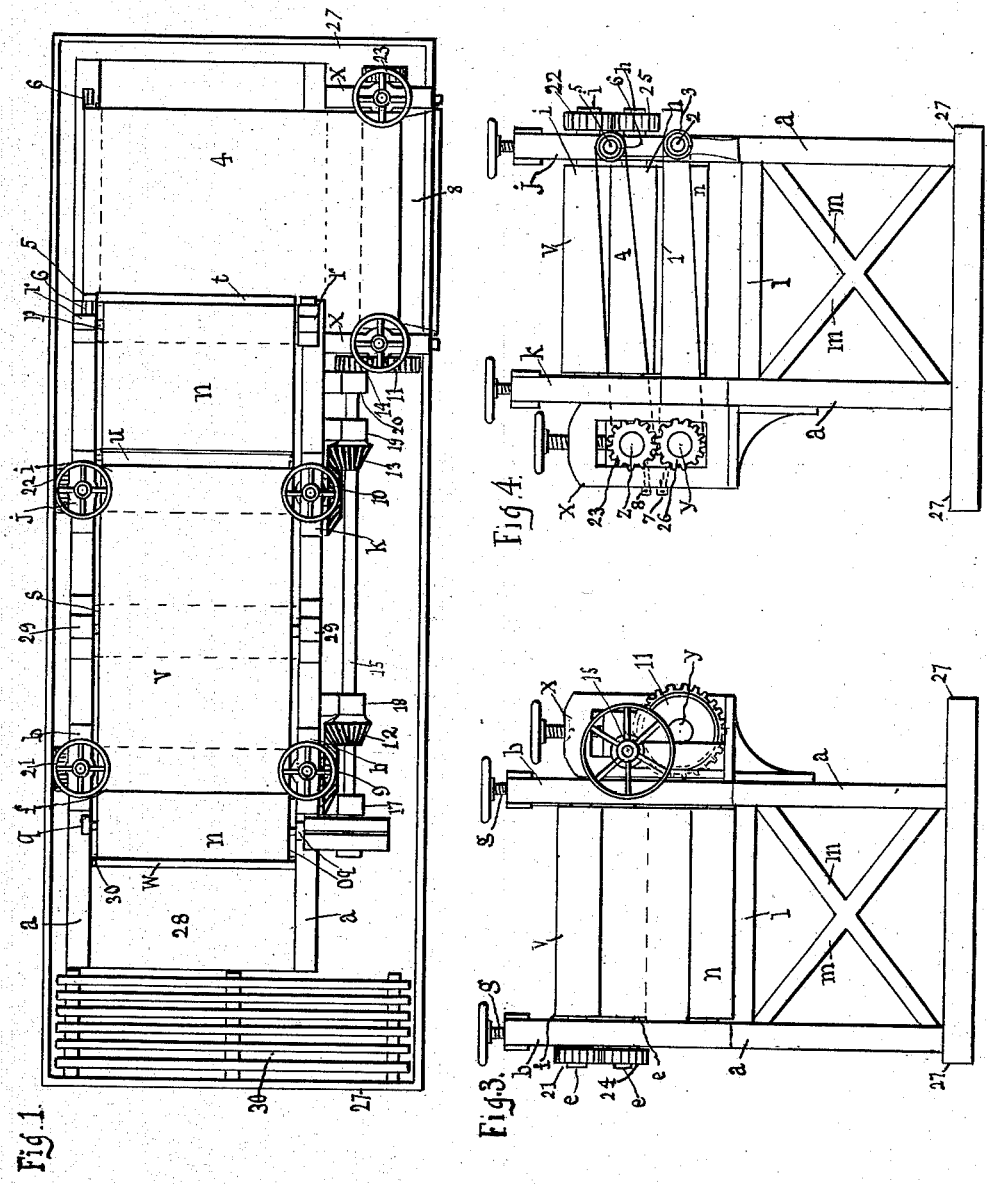
Figure 2:
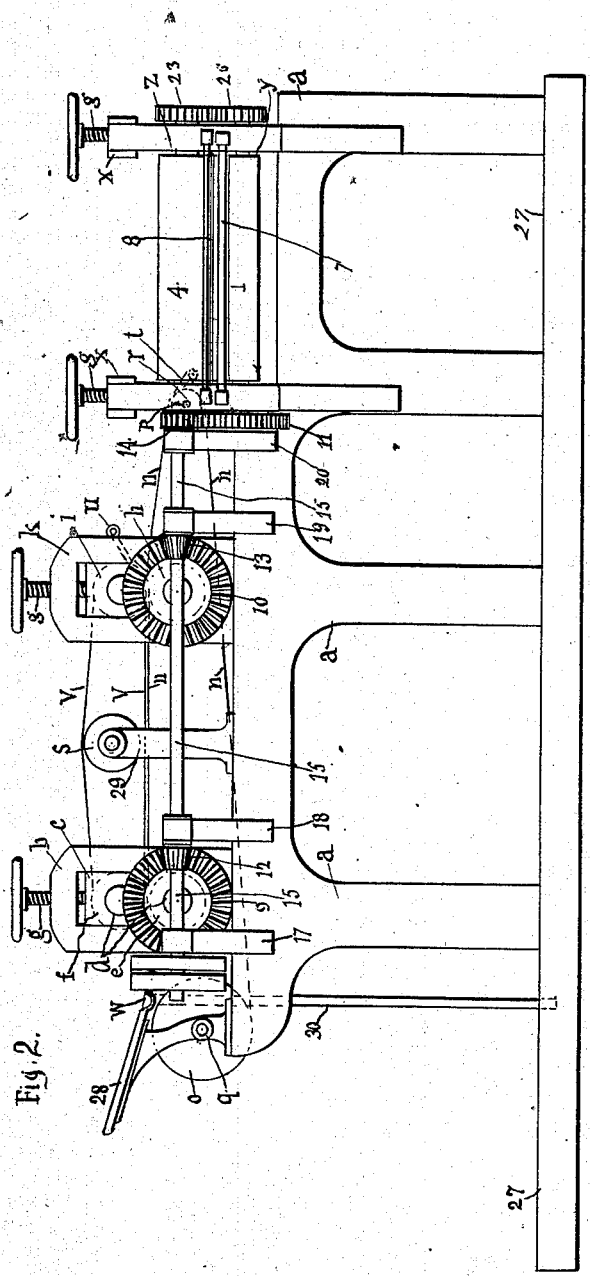

Figure 1 shows a plan of my apparatus or machine; Fig. 2, a side elevation thereof; Fig. 3, a front elevation of the receiving end thereof, and Fig. 4 an elevation of the rear or discharging end thereof.

Referring to the drawings, $a$ represents the side frames of the machine; $b$, housings supported thereon containing bearings $c$, supporting the necks $d$ of rollers $e$ and $f$, arranged in pairs with adjusting-screws $g$ to regulate the space or distance between the rollers of each pair. A second pair of rollers $h$ and $i$, having their axes parallel with the rollers $e$ and $f$, is supported in housings $j$ and $k$, also attached to the frame $a$. The frames $a$ are braced to each other by girths $l$ and braces $m$.

An endless apron $n$ passes above the rollers $e$ and $h$ and is supported and guided by rollers $o$ and $p$, supported and turning in bearings $q$ and $r$, attached to the frame $a$. A second endless apron $v$ passes below the rollers $f$ and $i$ and is guided and supported by a roller $s$, turning in bearings 29, attached to the frame $a$. A scraper or doctor $t$ is elastically secured to the frame $a$, so as to scrape in close contact with apron $n$ where it passes around the roller $p$. A similar doctor $u$ is attached to the housings $j$ and $k$ and is pressed against the apron $v$ where it passes around the roller $i$. An inclined shelf or feed-board 28 is placed in front of the rollers $e$ and $f$ and is provided with a channel or draining-gutter $w$ at its lower edge and end and is provided with a drain-tube 30 for conducting liquid therefrom. Attached to the frame $a$ is a third pair of housings $x$ $x$, in which are supported and turn a third pair of rollers $y$ and $z$, having their axes in a direction at right angles to the rollers $h$ and $i$ and in a position lower than the roller $p$. An endless apron 1 passes around the roller $y$ and the roller 2, supported in bearings 3, attached to the frame $a$. Another endless apron 4 passes around the roller $z$ and a roller 5, supported in bearings 6, attached to the frame $a$.

Scrapers and doctors 7 and 8, attached to the frame $a$, are applied to the aprons 1 and 4 at the parts supported by the rollers $y$ and $z$. The several pairs of rollers $e$ and $f$, $h$ and $i$, and $y$ and $z$ are rotated by gear-wheels 9, 10, and 11, applied to the lower rollers $e$, $h$, and $y$ and propelled by pinions 12, 13, and 14 and shaft 15, turning in bearings 17, 18, 19, and 20, attached to the frame $a$. The upper rollers $f$, $i$, and $z$ are turned by pinions 21, 22, and 23, engaging in corresponding pinions 24, 25, and 26 upon the lower rollers $e$, $h$, and $y$. The entire machine is placed upon a pan 27 to receive the water expressed from the leaves, as hereinafter described. A grating 30, of strips of wood, should be placed in the pan 27 for the operator to stand upon. The aprons $n$ and $v$ and 1 and 4 should be made of flexible non-adhesive material. Plates of thin metal are preferable for such use.

The operation of the machine is as follows: The tobacco-leaves, previously soaked and in water and softened and drained of the superfluous water, are laid successively upon the inclined feed-board 28 and spread out, with the stem in a direction parallel with the axes of the rollers $e$ and $f$, and slid downward upon the apron $n$, which, deriving motion from the roller $e$, carries the leaf between the apron $n$ and the apron $v$ between the rollers $e$ and $f$, which, pressing the aprons $n$ and $v$ close together, flattens the stem of the leaf, spreading it laterally. After passing the leaf from the pressure of the rollers $e$ and $f$ the aprons $n$ and $v$ convey it between the rollers $h$ and $i$, where it is further compressed, and the stem and the ribs of the leaf are reduced to the thickness of the web of the leaf, and the water contained in the leaf is expressed from it. The aprons $n$ and $v$ convey the leaf beyond the rollers $h$ and $i$ and deliver it upon the apron 1, which conveys it in a direction at right angles to its previous motion between the aprons 1 and 4, between the rollers $y$ and $z$, and from them it is delivered in a flat condition of uniform thickness to a box or receptacle, ready to be cut into pieces for use. The scrapers or doctors $t$, $u$, and 7 and 8 serve to separate the leaves from the aprons in case they should adhere thereto and to keep the surface of the aprons clear of any deposit from the water expressed from the leaves. The result of the operation of this machine is to reduce all the thicker portions of tobacco-leaves to uniform thickness with the web of the leaf, so that the entire leaf is susceptible of use and an economy of material results, as well as a saving of the labor now required in the process of stripping the leaves from the stems.

The machine may be constructed with a larger number of pairs of rollers without departing from my invention, the essential feature of the operation being the flattening and lateral spreading of the stems and veins of the leaves without breaking or tearing them from the web, and the subsequent pressing of them in lengthwise direction.

Having described my invention, what I claim is—

1. In a machine for preparing tobacco-leaves for manufacture, a series of rollers arranged in pairs with endless conveying-aprons arranged to flatten and spread laterally the stems of tobacco-leaves in combination with conveying-aprons and a pair of rollers having axes at right angles to the first series of rollers and means of rotating said rollers arranged to operate substantially as set forth.

2. In a machine for preparing tobacco-leaves for manufacture, two or more pairs of parallel compressing-rollers and endless aprons arranged to convey tobacco-leaves between said rollers and aprons and support them during the crushing and spreading operation, in combination with one or more doctors arranged to release the leaves from adhering to said aprons, as set forth and described.

3. In a machine for preparing tobacco-leaves for manufacture, two or more pairs of rollers and endless aprons arranged to convey tobacco-leaves between said rollers and deliver them therefrom in combination with endless aprons, and a pair of rollers and endless aprons at right angles to the first series of rollers and a doctor or doctors arranged to detach the leaves from the second pair of aprons substantially as set forth.

4. In a machine for preparing tobacco-leaves for manufacture, a supporting-frame two or more pairs of rollers and endless aprons arranged to convey and press the leaves laterally, a pair of rollers and aprons, at right angles to the aforesaid rollers, means of rotating said rollers, and doctors applied to the aprons in combination with a feeding shelf or table provided with a draining trough and tube, and a pan arranged to receive liquid expressed from the leaves as for the purpose set forth.

PHILIP H. ERTHEILER.

Witnesses:
C. R. MORGAN,
C. R. JONES.